350-269 SR

5/28/85 OR 4,519,676

United States Patent [19]

te Velde

[11] Patent Number: 4,519,676

[45] Date of Patent: May 28, 1985

[54] PASSIVE DISPLAY DEVICE

[75] Inventor: Ties S. te Velde, Eindhoven, Netherlands

[73] Assignee: U.S. Philips Corporation, New York, N.Y.

[21] Appl. No.: 460,420

[22] Filed: Jan. 24, 1983

[30] Foreign Application Priority Data

Feb. 1, 1982 [NL] Netherlands ........................ 8200354

[51] Int. Cl.³ ............................................. G02D 25/00

[52] U.S. Cl. .................................... 350/269; 350/486; 340/763; 340/783

[58] Field of Search ................ 156/664; 350/486, 267, 350/269, 360; 340/763, 764, 783, 787, 788, 815.04

[56] References Cited

U.S. PATENT DOCUMENTS

Re. 31,498 1/1984 te Velde ............................. 350/486
4,178,077 12/1979 te Velde ............................. 350/486
4,309,242 1/1982 te Velde ............................. 156/644

*Primary Examiner*—Bruce Y. Arnold
*Assistant Examiner*—William Propp
*Attorney, Agent, or Firm*—Paul R. Miller

[57] ABSTRACT

On the facing surfaces of first and second supporting plates, where at least the first supporting plate is transparent, first and second electrodes, respectively, are provided with at least the first electrodes being transparent. An opaque liquid is present between the supporting plates. Third electrodes which can be moved between the first and second electrodes by electrostatic forces are connected to the second supporting plate. The third electrodes are formed by a display part having a large number of apertures of which the color of the side facing the first supporting plates is contrasted with the color of the liquid. A number of resilient elements is provided below the display part with one end connected to the display part and the other ends connected to pillars which are provided on the second supporting plate.

18 Claims, 19 Drawing Figures

PASSIVE DISPLAY DEVICE

Figure 1A:
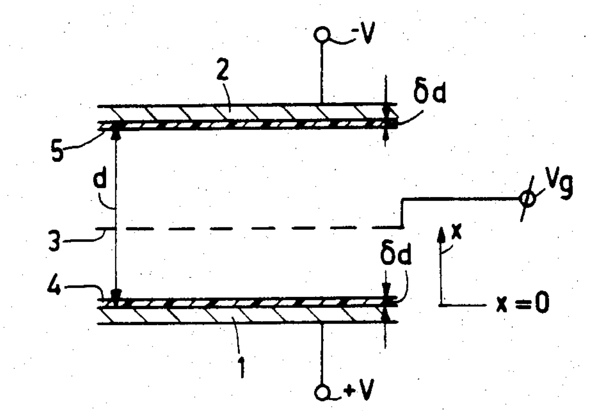

The invention relates to a passive display device comprising a first and a second supporting plate of which at least the first supporting plate is transparent, first and second electrodes on the facing surface of the first and second supporting plates respectively, at least the first electrodes being transparent, third electrodes which comprise an apertured display part which is secured to one of the supporting plates by means of a number of resilient elements, and which third electrodes can be moved between the first and second electrodes by electrostatic forces, and further comprising an opaque liquid between the supporting plates the colour of which liquid contrasts with the colour of the side of the third electrodes facing the first supporting plate. The invention also relates to a method of manufacturing such a device. An opaque liquid is to be understood to mean herein a liquid the depth of penetration of light in which is smaller than the distance between the supporting plates.

Such a passive display device is known from Netherlands Patent Application No. 7510103 and is used, for example, for displaying alphanumeric information. If the third electrodes are present on the side of the second electrodes, the colour of the opaque liquid is observed through the transparent first supporting plate. If the third electrodes are present on the side of the first electrodes, however, the colour of the third electrodes contrasting with the liquid is observed. The third electrodes which are connected to one of the supporting plates by means of a number of resilient elements can move between the supporting plates by applying a voltage on the first, second and third electrodes. The occurring resilient forces are negligible with respect to the electrostatic forces. The third electrodes are electrically insulated from the first and second electrodes by an insulating layer which is provided on the first and second electrodes. In the case in which the first and second electrodes are kept at a direct voltage of +V and −V respectively, or at an alternating voltage having an effective value V, and a variable voltage Vg is applied to the third electrodes, the electrostatic forces acting on the third electrodes are such that the third electrodes can assume only two stable positions at the first supporting plate or the second supporting plate. When a third electrode is at one of the supporting plates, the voltage Vg at the third electrode, dependent on the thickness of the insulating layer, may decrease to substantially +V or −V before it flips over to the other supporting plate. As a result of this bistable character the display device has a very large threshold voltage and a memory. These properties make it possible to realize large matrix display devices. In such a matrix display device the first electrodes, for example, form the row electrodes and the second electrodes form the column electrodes of the display device and all third electrodes are electrically interconnected. The manufacture of the movable third electrodes is carried out with a so-called undercutting technique. In this technique a layer is provided on an intermediate layer in which layer the pattern of third electrodes with resilient elements and apertures in the display part is etched. The material of the intermediate layer is then etched away via the edges and the apertures in the display part. This is continued until only the resilient elements are still connected to the substrate by means of a pillar. In this manner it is possible to make small resiliently connected electrodes which are very flat and are substantially free from mechanical stresses. In this manner third electrodes having an area of $0.5 \times 0.5$ mm$^2$ have been made with apertures of 4 μm diameter and a pitch of 20 μm. A display device having such third electrodes showed a switching time of 25 msec at a distance between the supporting plates of 25 μm and at control voltages of 30 V.

However, the known display device suffers from the disadvantage that with smaller third electrodes a considerable loss of contrast occurs and the control characteristic becomes asymmetrical.

In the known display device the resilient elements with which the third electrodes are connected to one of the supporting plates are situated beside and in the same plane as the apertured display part. As a result of this, area is lost for the actual display operation. The minimum possible area of the resilient elements is determined by the resolving power of the photo-etching methods used in manufacturing the third electrodes. This has for its result that when third electrodes become smaller the resilient elements occupy an ever increasing part of the area of a third electrode and the display part forms an ever smaller part of the area of a third electrode. When electrodes become smaller, the so-called whiteness, that is to say the effective reflecting area of a third electrode and hence also the contrast of the observed picture decreases.

In third electrodes having an area of approximately $0.5 \times 0.5$ mm$^2$ the resilient forces occurring as a result of the resilient elements are small with respect to the electrostatic forces. When third electrodes become smaller, the overall electrostatic forces decrease, whereas as a result of the decreasing size of the resilient elements, the resilient forces increase considerably. In the case of smaller electrodes the resilient forces are hence no longer negligible. The result of the comparatively large resilient forces is that an asymmetric control characteristic is obtained which is much less ideal for matrix control.

It is hence the object of the invention to provide a display device having small third electrodes with which pictures having a high contrast can be observed. For that purpose, a display device of a kind mentioned in the opening paragraph is characterized according to the invention in that the resilient elements of the third electrodes are present below the display parts of the third electrodes at the side remote from the first supporting plate. As a result of this the entire area of a third electrode can be used as a display part. As a result of this construction whiteness has become independent of the size of the third electrodes. As a result of this, smaller third electrodes than before can be manufactured while substantially maintaining contrast. Since the resilient elements are provided below the display part, the fill area below the display elements may be used in designing the resilient elements. As a result of this larger freedom of design, very small spring constants can easily be realized so that the occurring resilient forces are negligible with respect to the electrostatic forces even in small third electrodes. Furthermore, more resilient elements can be provided below the display part than is strictly necessary, which increases the reliability (redundance) of the display device. Moreover, the accurate photolithographic processes, as used in the case in which the resilient elements are situated in the same plane as the display part, are not necessary for the manufacture of the resilient elements.

According to the invention, display elements having small dimensions can now also be manufactured which have a substantially ideal hysteresis curve with an associated large threshold voltage and a memory. These properties are required to realize large matrix display devices. An embodiment of such a display device is characterized according to the invention in that the first electrodes form a first set of strip-shaped electrodes, the second electrodes form a second set of strip-shaped electrodes, and the third electrodes are arranged according to columns crossing the strip-shaped electrodes of the second set substantially at right angles. The third electrodes arranged according to columns may be electrically interconnected in a column.

The electrodes of the second set, for example, form the row electrodes and the electrodes of the third set form the column electrodes of the matrix. Such voltage pulses are applied to a row electrode and a column of third electrodes that only the display element formed by a third electrode at the crossing of the row electrode and column electrode in question flips over. The large threshold voltage prevents half-selected third electrodes from flipping over. It is also possible not to interconnect the third electrodes arranged according to a column, so that each of the third electrodes can be driven individually.

A further embodiment is characterized in that the first electrodes form a common electrode. As a result of this the accurate alignment of electrodes on the first supporting plate with respect to electrodes of the second supporting plate is avoided.

Such matrix display devices may be used, for example, for displaying television pictures, as a telephone display, computer terminal, teletext display and generally as an alphanumeric display. The number of lines of text to be displayed depends on the number of row electrodes and the number of column electrodes per character.

A further embodiment is characterized in that the second supporting plate is formed by a semiconductor layer in which a set of memory elements arranged in rows and columns are provided, which memory elements can be driven and provided with information by means of a matrix of row electrodes and column electrodes provided on the semiconductor layer, in that the third electrodes are formed by a set of picture electrodes arranged in rows and columns, and in that each picture electrode is connected to a memory element in the semiconductor layer. The information is no longer written simultaneously with but separated from the flipping over of the movable third electrodes. The information is written in the semiconductor layer and the information for each picture element is stored in the associated memory element. The memory elements are driven and provided with information by means of a matrix of row and column electrodes. After a row of memory elements has been provided with information, the next row of memory elements may be provided with information since the memory elements of the previously driven row retain the information necessary for flipping over of the movable third electrodes. It is therefore no longer necessary for driving the next row to wait until the movable third electrodes of the previous row have flipped over. The information is written electronically and no longer mechanically. As a result of this the information can be written more rapidly while the picture corresponding to the written information can also be observed more rapidly.

As explained, small movable third electrodes can be manufactured by providing the resilient elements below the display part. For displaying pictures having a high information density, not only small picture elements are required but, in particular in cases in which the display device comprises a semiconductor layer for the rapid writing of information, rapid picture elements are also required. In the display elements in which the resilient elements are situated in the same plane as the display part, the apertures in the display part should be kept comparatively small so as to obtain a reasonable whiteness. In the display elements according to the invention in which the resilient elements are present below the display part, the resulting higher whiteness gives a larger freedom with respect to the size of the apertures in the display part. By maintaining a reasonably large whiteness, larger apertures than before can be provided in the display part. As a result of the larger apertures, more rapid display elements are obtained as a result of the reduced resistance in the liquid. The display elements formed by the movable electrodes may be of any suitable shape. This shape generally is a polygon and in particular a square or a hexagon. In the case of a hexagon, the display elements are arranged according to a honey-comb structure. With a given intermediate space between adjacent display elements the hexagonal shape has for its advantage, as compared with the square shape, that, with the area of the display elements remaining the same, the area of filling is better and consequently the whiteness is greater. The resilient elements generally are strip-shaped. As a result of a radially-symmetrical arrangement of the resilient strips, the display element, during its displacement, can rotate slightly in its plane. Such a rotation does not occur when the resilient strips are mirror-symmetrical with respect to a diagonal or a major axis of the display element. A further embodiment of a display device in accordance with the invention is characterized in that the apertures in the display part of a third electrode have such a size that the switching time of the third electrodes is smaller than 1/25 second. For displaying moving television pictures approximately 25 frames per second are necessary. The size of the apertures in the display part can now be chosen to be such that the switching times of the third electrodes are small as compared with the picture time (1/25 sec) of a television picture. By a suitable choice of the size of the apertures, switching times smaller than, for example, 1 msec can be obtained. Thus grey scales can be made by driving the third electrodes during fractions of a frame time so that the display device is suitable for displaying black-and-white television pictures.

A further embodiment is characterized in that the surfaces of the third electrodes facing the first supporting plate form at least two sets of electrodes reflecting light in different colours. By causing the surfaces of the third electrodes facing the first supporting plate to reflect alternately red, green and blue light, it is possible to display colour television pictures.

Another embodiment with which colour pictures can be displayed is characterized in that at least two sets of filters passing light of different colours are provided on the first electrodes.

A method manufacturing a display device according to the invention is characterized in that it comprises the following steps:

(a) providing on a substrate a first layer of a material which can be etched by means of a first etchant, (b) providing a second layer of a material which can be etched by means of a second etchant, (c) providing the pattern of resilient elements in the second layer by means of a photoetching method using the second etchant, (d) providing a third layer of the same material as the first layer, (e) making apertures in the third layer by means of a photoetching method using the first etchant at the area where the resilient elements should remain connected to a display element to be formed, (f) providing a fourth layer of a material which can be etched by means of a third etchant, (g) providing in the fourth layer the pattern of the display part having aperture by means of a photoetching method using the third etchant, (h) making, by means of the second etchant, apertures in those parts of the resilient elements which are connected to the display part, the corresponding parts of the display part serving as a mask, and (i) removing the third layer and parts of the first layer by undercutting via the apertures and edges in the fourth and second layers by means of the first etchant.

A further embodiment of such a method is characterized in that (a) the first layer is of aluminium, (b) after providing the first layer of aluminium the regions of the layer which should remain connected to the supporting plate are anodized, and in that (c) upon removing the first layer by undercutting only the non-anodized parts of the aluminium layer are etched away.

Still a further embodiment is characterized in that the second layer is an electro-deposited nickel layer. As a result of the electrodeposition, resilient elements are obtained which are substantially free from mechanical stresses. Still a further embodiment is characterized in that the fourth layer is a silver layer.

Figure 1B:
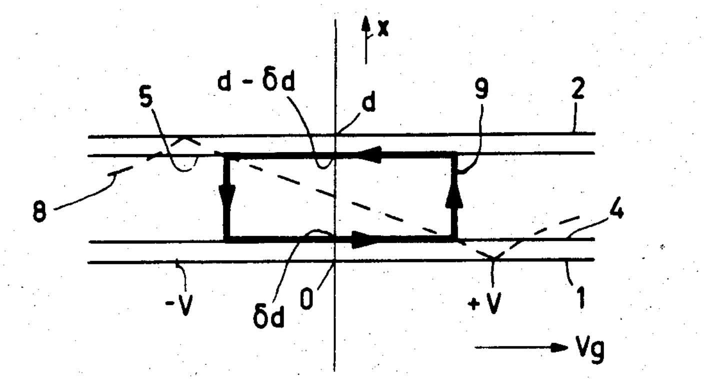
Figure 2:
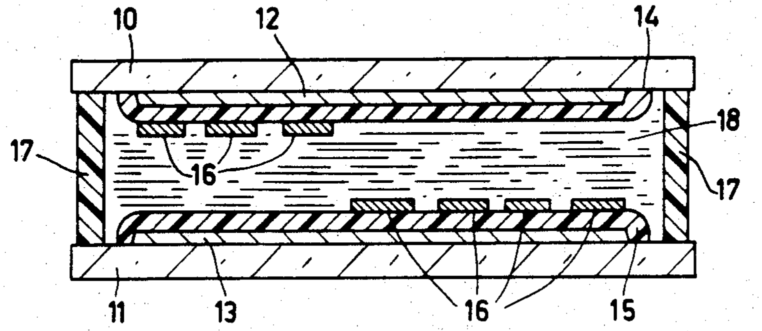

The invention will now be described in greater detail, by way of example, with reference to the accompanying drawings, in which FIGS. 1*a* and 1*b* are diagrammatic drawings to explain the operation principle of the display device, FIG. 2 is a diagrammatic sectional view of a first embodiment of a display device according to the invention, FIGS. 3*a* to 3*f* explain a first method of manufacturing a movable electrode, FIG. 3*g* explains a second method of manufacturing a movable electrode, FIGS. 4*a* to 4*d* show diagrammatically a number of embodiments of movable electrodes and the resilient elements connected thereto.

Figure 5A:
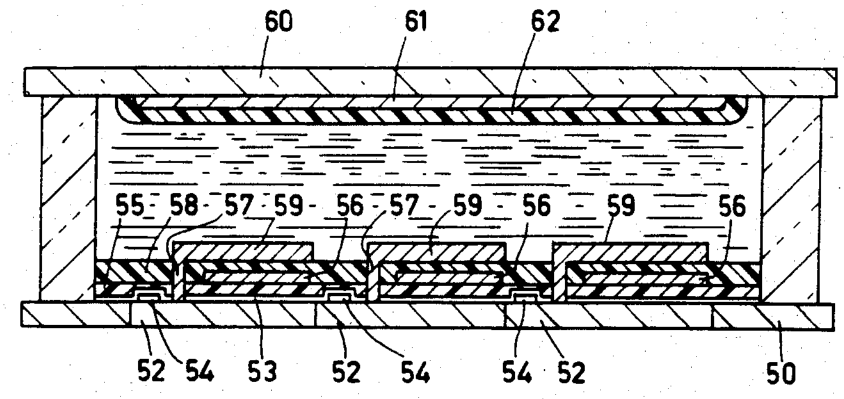
Figure 5B:
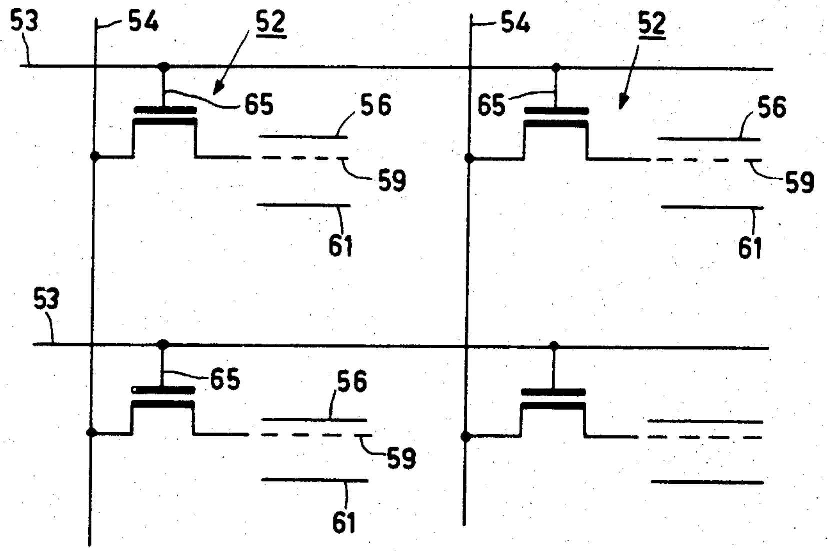
Figure 6A:
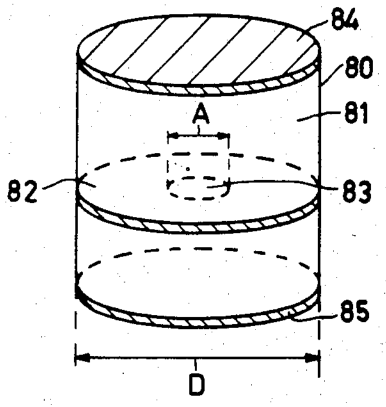
Figure 6B:
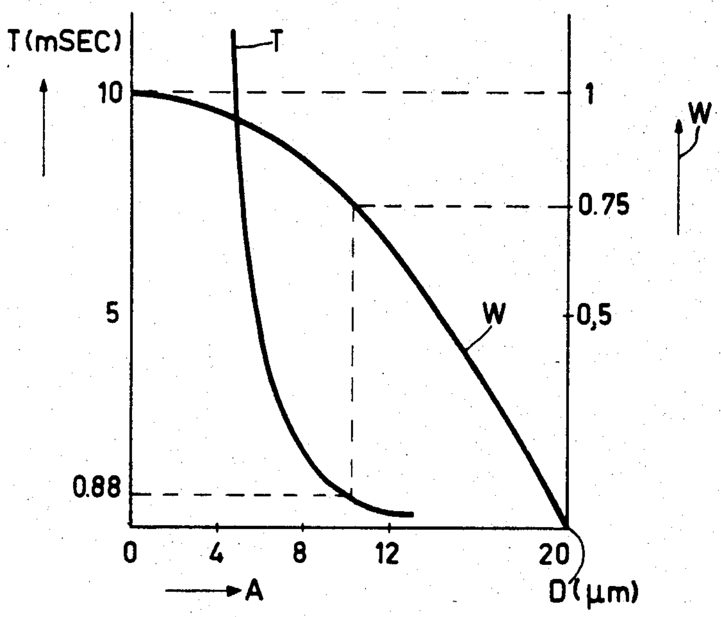
Figure 7:
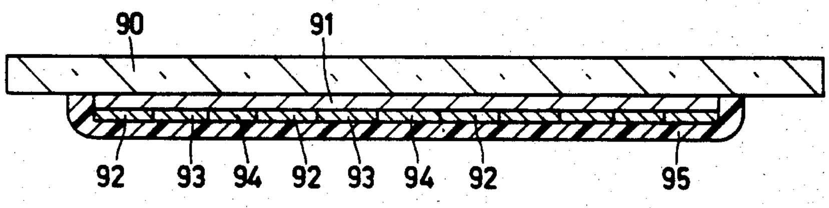

FIG. 5*a* is a diagrammatic sectional view of a second embodiment of a display device in accordance with the invention, FIG. 5*b* is a structure diagram of the device shown in FIG. 5*a*, FIGS. 6*a* and 6*b* explain the principle of a third embodiment of a display device in accordance with the invention, and FIG. 7 shows diagrammatically a part of a fourth embodiment of a display device in accordance with the invention.

With reference to FIGS. 1*a* and 1*b* the operating principle will be explained of a third electrode which is movable between two electrodes by electrostatic forces, as in a display device according to the invention. FIG. 1*a* shows diagrammatically two fixed electrodes 1 and 2 at a mutual distance d. A movable electrode 3 is present between the electrodes 1 and 2 at a distance x from electrode 1. Insulating layers 4 and 5 having a thickness δd are provided on the electrodes 1 and 2. The third electrode 3 can hence move between the extreme positions $x=\delta d$ and $x=d-\delta d$, where the inner face of electrode 1 represents x=0 as shown in FIG. 1*b*. Voltage pulses +V and −V are applied to the electrodes 1 and 2, while a variable voltage pulse Vg is simultaneously applied to the third electrode 3. With the dielectric constants of the liquid and the insulating layers substantially the same, an electrostatic force $$p1 = \tfrac{1}{2}\epsilon\left(\frac{V - Vg}{d - x}\right)^2$$

directed towards electrode 2 and an electrostatic force $$p2 = \tfrac{1}{2}\epsilon\left(\frac{V + Vg}{x}\right)^2$$

directed towards electrode 1 is exerted on the electrode 3 per unit area, ε being the dielectric constant of the medium between the electrodes 1 and 2. The broken line indicating the equilibrium between the forces is indicated by reference numeral 8 in FIG. 1*b*. This line 8 intersects the line $x=\delta d$ at a voltage $Vg=-V+\delta V$ and the line $x=d-\delta d$ at a voltage $Vg=+V-\delta V$. The equilibrium of electrode 3 is naturally labile for when the electrode 3 is moved from the equilibrium condition over a small distance the electrostatic force between the approaching electrodes becomes larger and the electrostatic force between the receding electrodes becomes smaller. As a result of this the third electrode has only two stable states in the range of voltages Vg between −V+δV and +V−δV, namely against the insulating layer 4 at $x=\delta d$ and against the insulating layer 5 at $x=d-\delta d$. For example, when the electrode 3 engages the insulating layer 4, the voltage Vg may increase to substantially V−δV before the third electrode 3 flips over to electrode 2. The voltage Vg can now decrease again to substantially −V+δV before the electrode 3 can flip back to electrode 1. In this manner the electrodes 3 traverses a substantially ideal hysteresis loop which is indicated by the line 9. As a result of this the device has a large threshold voltage and a memory.

A first embodiment of a matrix display device according to the invention based on the above-described principle will be explained with reference to FIG. 2 which is a sectional view of the device. The device comprises two parallel supporting plates 10 and 11 of which at least the supporting plate 10 is transparent. The supporting plates 10 and 11 are, for example, of glass or another material. A transparent electrode 12 is provided on the supporting plate 10. Strip-shaped electrodes 13 are provided on the supporting plate 11. The electrodes 12 and 13 have a thickness of approximately 0.1 μm and are manufactured, for example, from indium oxide and/or tin oxide. Electrically insulating layers 14 and 15 of quartz, 1 to 2 μm thick, are provided on the electrodes 12 and 13. The device further comprises a number of movable electrodes 16 shown diagrammatically which are connected to the insulating layer 15 by means of a number of resilient elements. The electrodes 16 are connected together in one direction by means of their resilient elements and form strip-shaped electrodes which cross the electrodes 13 substantially at right angles. The construction and the manufacture of the electrodes 16 will be described in greater detail with reference to FIG. 3. The surface of the electrodes 16 facing the transparent supporting plate 10 is reflective. The supporting plates 10 and 11 are kept spaced apart and the device is sealed by an edge of sealing agent 17. The space between the supporting plates 10 and 11 is filled with an opaque non-conductive liquid 18 the colour of which is contrasting with the diffuse-reflecting colour of the electrodes 16. The liquid 18 is formed, for example, by a solution of Sudan-black in toluene. By applying voltages to the electrodes 12, 13 and 16, the electrodes 16 can be driven from one stable state to the other. When the electrodes 16 are present against the insulating layer 14, the ambient light is reflected by the electrodes 16. When the electrodes 16 are present against the insulating layer 15, the electrodes 16 on the side of observation are not visible through the transparent supporting plate 10 and the ambient light is absorbed by the liquid 18 or is at least reflected only in the colour of the liquid 18. The device forms a so-called matrix display device in which the strip-shaped electrodes 13 form, for example, the row electrodes and the strip-shaped electrodes 16 form the column electrodes of the device.

When a picture is written, the device is initially in a state in which all third electrodes 16 are present on the side of the second supporting plate 11. The row electrodes 13 and the common electrode 12 are kept at voltages V and 0 volts, respectively. The row-electrodes 13 are driven alternately with voltage pulses which set the voltage at the electrodes at 2 V. The information for a driven row electrode 13 is simultaneously presented to all column electrodes. Voltage pulses of 2 V are applied to the column electrodes the electrode 16 of which at the crossing with the driven row electrode 13 must flip over to the first supporting plate 10, while voltage pulses of $\frac{2}{3}$ V are applied to the remaining column electrodes. After writing, all electrodes 16 can be brought back to the second supporting plate 11 by simultaneously bringing all column electrodes to 0 V for a short period of time.

Figure 3A:
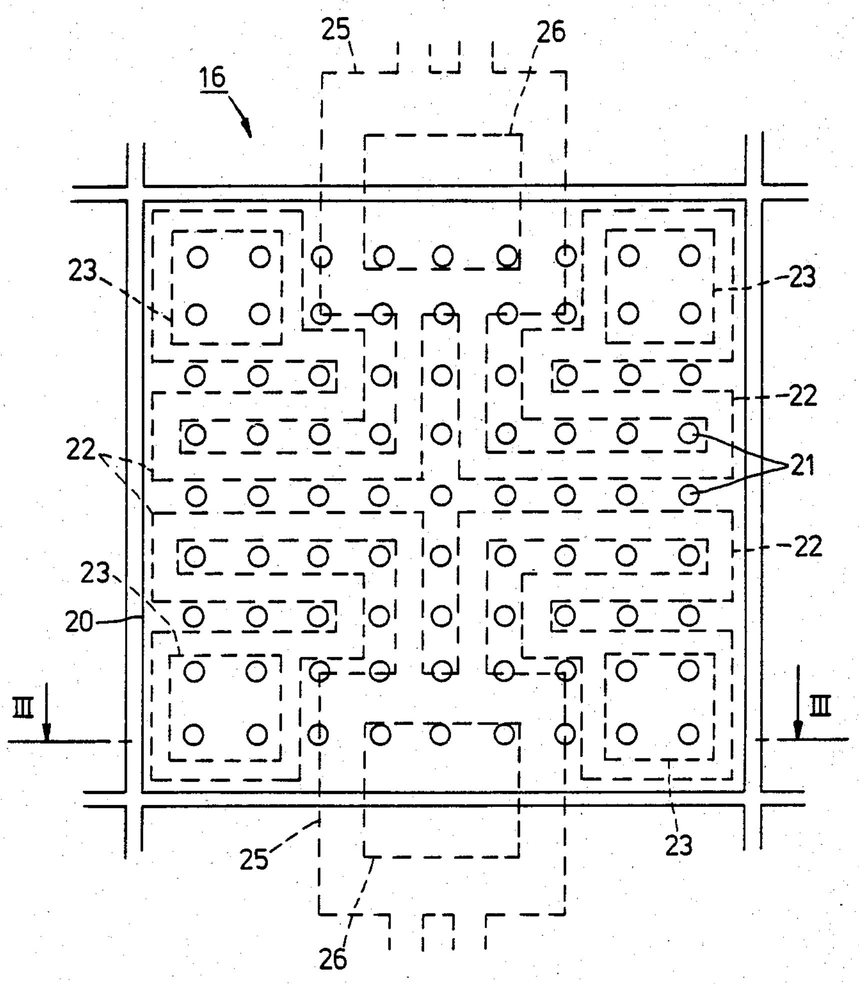

FIG. 3*a* is a plan view of a movable electrode 16. The display part 20 thereof is formed by a diffuse-reflecting silver layer provided with a large number of apertures 21. Four resilient elements 22 which are shaded in the Figure are provided below the display part 20. The ends of the resilient elements 22 which are connected to the display part 20 are shown in dotted lines 23. These ends 23 have apertures which correspond to apertures 21 in the display part 20. The other ends 25 of the resilient elements 22 are connected to the supporting plate by means of pillars 26. Since the resilient elements 22 are present below the display part 20, the complete surace of the movable electrode 16 is used for displaying. Since furthermore the whole area of the display part 20 can be used for designing the resilient elements 22, small spring constants can be realized in a simple manner so that also in the case of electrodes having small dimensions the resilient forces are negligible as compared with the electrostatic forces. In principle two resilient elements 22 are required for the movable electrode 16. Because the resilient elements 22 are present below the display part, more resilient elements 22 can be provided, which increases the redundancy of the device, because the movable electrode 16 keeps functioning in case one or more of the resilient elements 22 cease working. The manufacture of the movable electrodes 16 will be explained with reference to FIGS. 3*b* to 3*f* which are sectional views taken on the line III—III of FIG. 3*a* during the various stages of the manufacture. FIG. 3*b* shows a supporting plate 30 on which a 0.2 μm thick strip-shaped electrode 31 and a 1.5 μm thick insulating layer 32 are provided. First a 0.4 μm thick aluminium layer 33 is provided on the layer 32 and then a 0.5 μm thick nickel layer 34 is provided. The nickel layer 34 is provided by electrodeposition of the layer 34 from a nickel sulphate bath. As a result of this the nickel layer 34 is obtained which engages the aluminium layer 33 free from mechanical stresses. The shape of the resilient elements 22 is etched in the layer 34 by means of a photo-etching method with reference numeral 23 denoting the ends of the resilient elements 22 which are to be connected to the display part 20 still to be formed (FIG. 3*c*). The movable electrodes 16 are electrically through-connected in one direction by means of the resilient elements 22 (see FIG. 3*a*). The etchant is nitric acid which does attack the nickel layer 34 but does not attack the aluminium layer 33. Since the resilient elements 22 need no longer be constructed to be as small as possible, less accurate photolithographic processes will suffice in manufacturing the elements 22. A 0.3 μm thick aluminium layer 35 is then provided over the nickel layer 34 and the exposed parts of the aluminium layer 33. Four windows 36 are etched in the aluminium layer 35 at the area of the ends 23 of the resilient elements 22 (see FIG. 3*d*). A silver layer having a thickness of 0.3 μm is provided over the assembly. The pattern of the display part 20 having apertures 21 is then etched in this layer by means of a photo-etching method (FIG. 3*e*). The etchant is an iron nitrate solution which does not attack the underlying aluminium layer 35 and the nickel layer 34. Apertures 24 are then etched in the ends 23 of the resilient elements 22 by means of nitric acid with corresponding parts of the display part 20 serving as a mask. The aluminium layer 35 and the aluminium layer 33 are then etched away by so-called undercutting via the apertures 21 in the display part 20, the apertures 24 in the ends 23 of the resilient elements 22, and via the edges of the resilient elements 22. Sodium hydroxide solution is used as an etchant which does attack the aluminium layers 35 and 33 but does not attack the nickel layer 34 and the silver layer 37. Etching is discontinued at the instant at which only the ends 25 of the resilient elements 22 are still connected to the supporting plate 30 by means of an aluminium pillar 26 (FIG. 3*f*).

A second embodiment of a method of manufacturing movable electrodes will be explained with reference to FIG. 3*g*. First again an aluminium layer 33 is provided on the insulating layer 32. A layer 38 of a photolacquer is then provided on the layer 33 and apertures 39 are made therein in a known manner. The apertures 39 correspond to the regions 26 in the aluminium layer 33 with which the ends 25 of the resilient elements 22 are connected to the supporting plate 30 (see FIG. 3*a*). The aluminium is then anodized at the area of the apertures 39. In FIG. 38 these regions are referenced 40. The photolacquer layer 38 is then removed. For the rest the method continues as described with reference to FIGS.

3b to 3f with the exception of the last etching step. In this case etching is carried out with concentrated phosphoric acid which does attack the aluminium layers but does not attack the anodized regions 40.

Very small movable electrodes 16 can be manufactured in these above-described manners. The area of the display part 20 is, for example, 200×200 $\mu m^2$ and the display part comprises, for example, apertures 21 having a diameter of 6 μm at mutual separation distances of 20 μm.

Figure 4A:
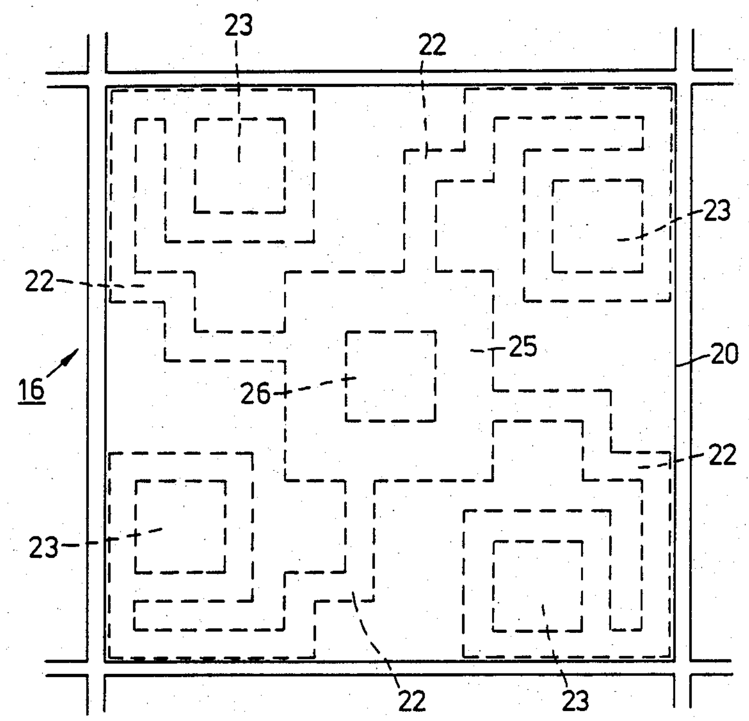
Figure 4B:
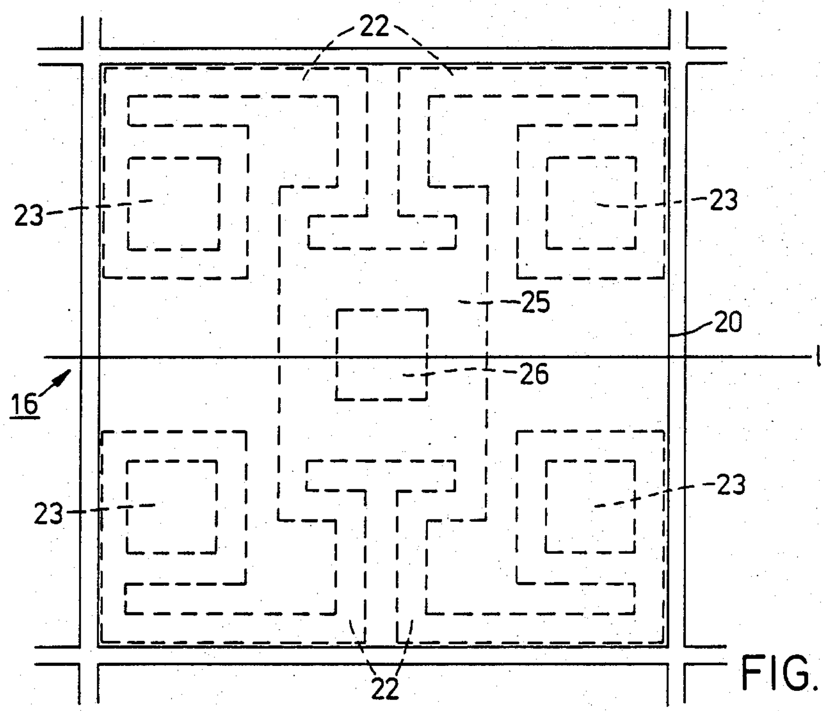
Figure 4C:
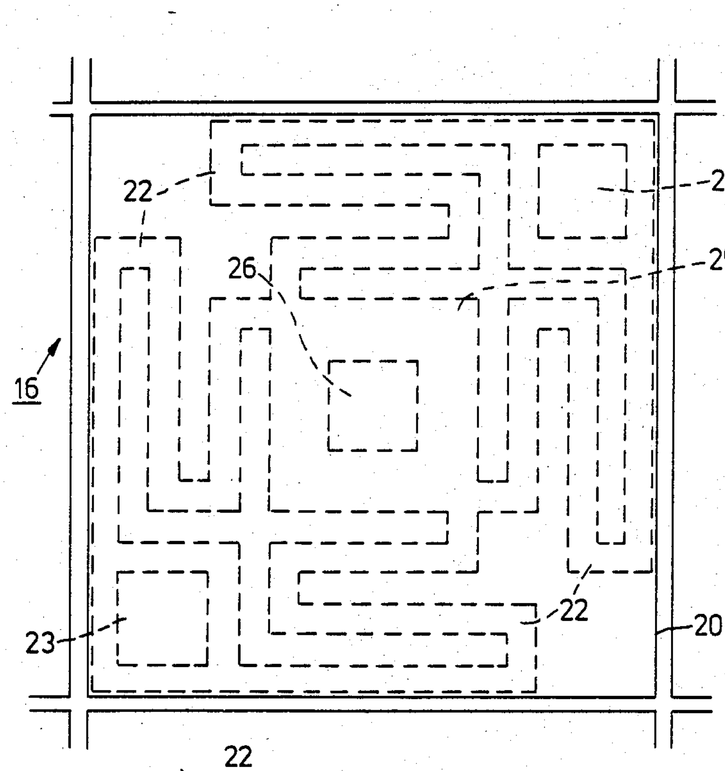
Figure 4D:
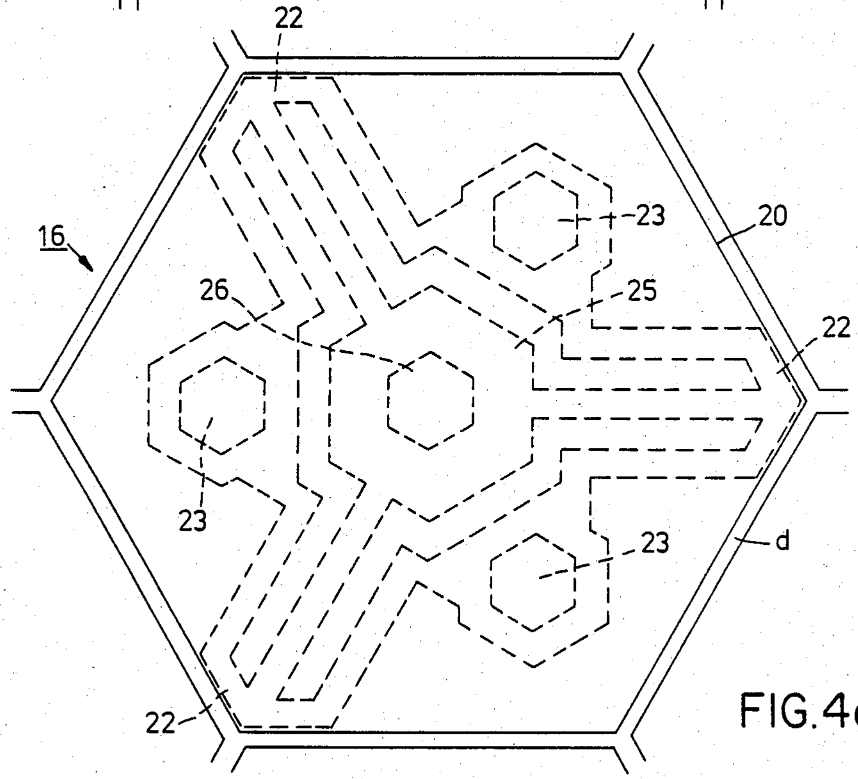

FIGS. 4a to 4d show a number of embodiments of movable electrodes 16 and the resilient elements connected thereto. The way in which all this is shown is analogous to that of FIG. 3a, with the difference that the apertures 21 in the display part 20 of the electrode 16 are not shown to avoid ambiguity of the drawing. For clarity, furthermore, corresponding elements are referred to by the same reference numerals as in FIG. 3a. The FIG. 4a embodiment comprises below the display part 20 four strip-shaped springs 22 which are arranged radially symmetrically with respect to the center of the display part 20. The ends 23 of the springs 22 are connected to the display part 20. The other ends of the springs 22 are connected to the supporting plate (not shown in the drawing) via a common part 25 by means of a central pillar 26. As a result of the radially symmetrical arrangement of the springs 22, the display part 20 will rotate slightly in its own plane when moved at right angles to the plane of the drawings. Such a rotation does not occur in the embodiments shown in FIGS. 4b to 4d. In FIG. 4b the springs 22 are mirror-symmetrical with respect to the major axis i and in FIGS. 4c and 4d the springs 22 are mirror-symmetrical with respect to a diagonal of the display part 20. The hexagonal shape of the display part 20 shown in FIG. 4d, with a given intermediate space d between the adjacent display parts 20, provides a better area filling and hence a greater whiteness. The method of manufacturing the embodiments shown in FIGS. 4a to 4d is analogous to that explained with reference to FIGS. 3a to 3g. The central position of the pillars 26 with respect to the display part 20 makes the embodiments shown in FIG. 4a to 4d particularly suitable for the individual driving of the electrodes 16. This possibility will be described in greater detail with reference to the embodiments of a display device shown in FIGS. 5a and 5b.

Figure 3:
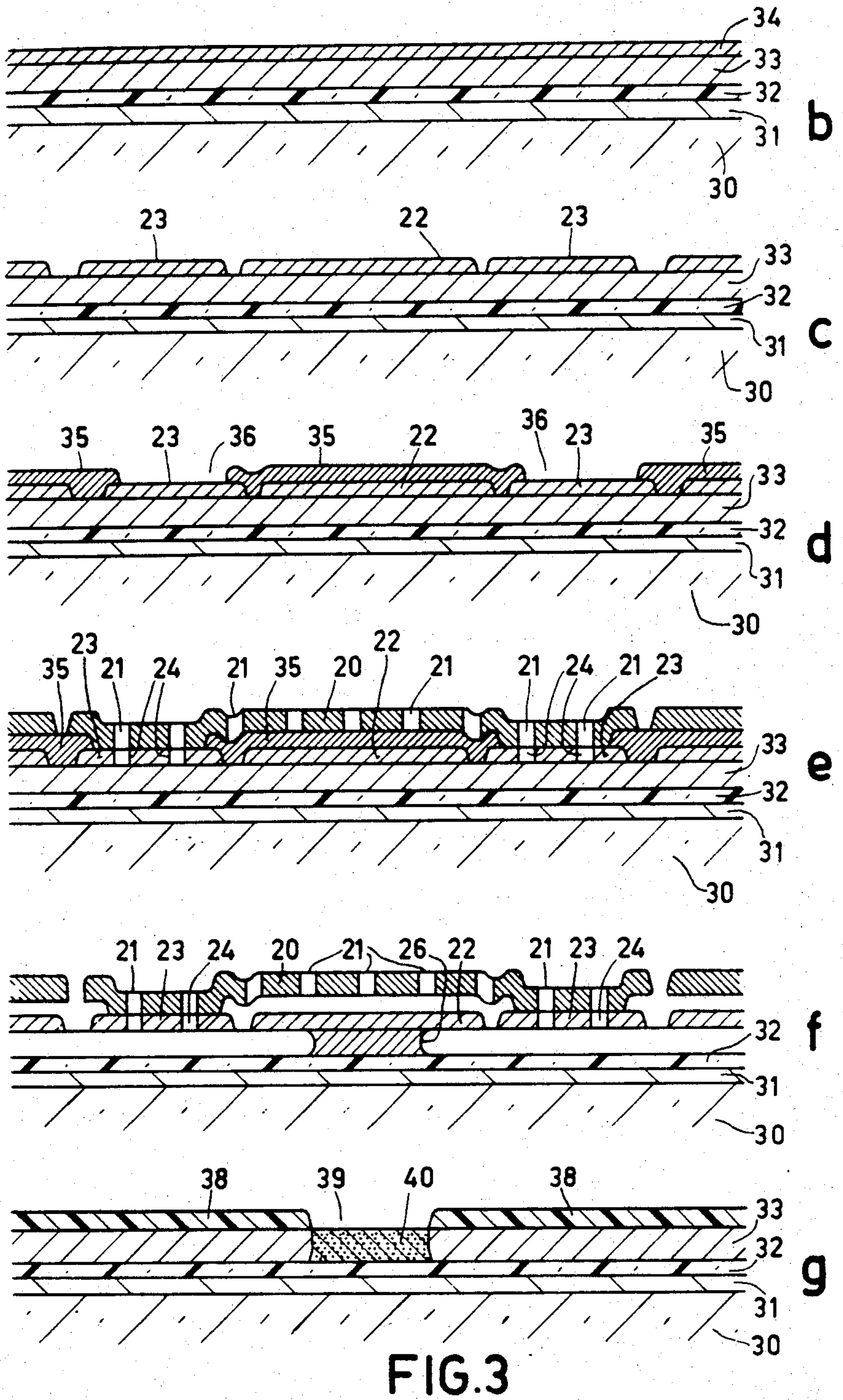

FIG. 5a is a diagrammatic sectional view of the display device. The lower supporting plate is formed by a semiconductor layer 50 of, for example, silicon. A set of memory elements 52 arranged in rows and columns is provided in the semiconductor layer 50. The memory elements 52 may be provided with information by means of a matrix of row electrodes 53 and column electrodes 54 provided on the semiconductor layer 50 and insulated from each other at the crossings. A silicon oxide layer 55 is provided over this structure and strip-shaped electrodes 56 are provided on it. An insulating quartz layer 58 on which individual resiliently connected electrodes 59 are provided in the same manner as described with reference to FIGS. 2 and 3 is provided over the electrodes 56. Each electrode 59 is connected via an aperture 57 in the layers 55 and 58 to memory elements 52. A common electrode 61 which is covered with an insulating quartz layer 62 is provided on the other supporting plate 60. Again an opaque liquid is present between the supporting plates 50 and 60.

The operation of the display device will be explained with reference to FIG. 5b which shows a structure diagram of the device. Each memory element is formed by a field effect transistor 65, the gate and source of which are connected to a row electrode 53 and a column electrode 54 respectively. The drain of the transistor is connected to a movable third electrode 59. A row electrode 53 is driven with a positive voltage pulse. The transistors 65 connected to a driven row electrode 53 hereby become conductive. The information for a driven row electrode 53 is simultaneously presented to all column electrodes 54. The presented voltage pulses charge the associated electrodes 50. In this manner all row electrodes 53 are successively driven and the associated electrodes 59 are provided with charge. A charge on the electrode 59 of a row electrode 53 cannot leak away because after driving a row electrode 53 the transistors 65 again come in the non-conductive state. Dependent on the presence or absence of a charge an electrode 59 flips over to the supporting plate 60 under the influence of the voltage on the electrodes 56 and 61. Since writing of information occurs electronically and the write time is no longer determined by the time necessary for flipping over of the electrodes 59, writing can be done more rapidly and the picture corresponding to the written information can also be observed more rapidly. Instead of a single transistor the memory elements may also be provided with several transistors and/or capacitors.

A third embodiment of a display device in accordance with the invention suitable for displaying black-and-white television pictures will be explained with reference to FIG. 6. FIG. 6a shows diagrammatically an elementary cell of a third electrode 82 with aperture 83 which moves over a distance h in a cylinder 80 filled with liquid 81 between a first electrode 84 and a second electrode 85. At a voltage difference V between the first electrode 84 and the second electrode 85, in which the third electrode 82 is connected to one of the electrodes, the transit time T is given to an approximation by the following formula:

$$T = \frac{4\pi\eta}{\epsilon V^2} \cdot \frac{D^2 h^3}{A^3} \qquad (1)$$

wherein η and ε are the viscosity and the dielectric constant of the liquid 81, respectively, and D and A are the diameters of the third electrode 82 and the aperture 83, respectively and h is the distance between electrodes 84 and 85.

For a toluene-filled device $\eta = 0.6\ 10^{-3}$ Nsec $m^{-2}$ and $\epsilon = 2.13.10^{-11}$ F $m^{-1}$. At a distance $h = 25.10^{-6}$ between the first and second electrodes 84 and 85 and a diameter $D = 20.10^{-6}$ m of the third electrode 82 the transit time is given by:

$$T = \frac{2.22\ 10^3}{V^2 A^3} \qquad (2)$$

In FIG. 6b the transit time T is plotted as a function of the diameter A of the aperture 83 for the case V=50 Volts. Also plotted in FIG. 6a on the right-hand side is the whiteness W, i.e. the effective reflecting surface of the electrode 82 as a function of the diameter A of the aperture 83. It appears from the Figure that the realization of short transit time T, i.e. a rapid display, is at the expense of the whiteness W and hence also at the expense of the contrast. It is possible, however, to manufacture rapid third electrodes 83 having a comparatively large contrast. In the situation shown in FIG. 6*a* third electrodes 83 having a transit time T=0.88 msec have a whiteness W=0.75.

The transit time T can still be reduced by reducing the distance h and/or increasing the voltage V. When there is a reduction of the distance h and the electrostatic forces on the third electrodes 82 remain the same, then the voltage V should also be reduced in which in that case the transit time T reduces to the same extent as h. Since the transit time T is inversely proportional to $V^2$, the transit time T becomes still much smaller when the voltage V is increased.

As a result of the short transit time T, black-and-white television pictures can be displayed by means of a display device in accordance with the invention. For displaying moving television pictures substantially 25 frames per second are necessary. Since switching times T can now be realized which are small as compared with the frame time, grey scales can be made by driving third electrodes 82 for fractions of a frame time.

A display device for displaying black-and-white television has the same construction as the device shown in FIG. 5*a*, with the difference that each memory element 52 has a counter which counts the number of clock pulses with which the fraction is determined in which a third electrode is driven.

According to a further embodiment not shown the movable electrodes comprise alternately red, green and blue-reflecting surfaces with which colour television pictures can be displayed.

A further embodiment of a display device in accordance with the invention will be explained with reference to FIG. 7 which shows diagrammatically a part of the display device. Again a transparent common electrode 91 is present on the transparent supporting plate 90. On the electrode 91, regions 92, 93 and 94 passing light in the colours red, green and blue are provided. An insulating layer 95 is provided again over the colour filters. When, for example, a movable electrode engages a region 92, red light is reflected by the electrode. In this manner it is also possible to display colour television pictures.

What is claimed is:

1. A passive display device comprising
- first and second supporting plates with at least one of said supporting plates being transparent,
- first and second electrodes on facing surfaces of said first and second supporting plates respectively, at least said first electrodes being transparent,
- third electrodes movable between said first and second electrodes by electrostatic forces, said third electrodes including apertured display parts secured to one of said first and second supporting plates by a plurality of resilient elements,
- wherein said resilient elements are located between said display parts of said third electrodes and said second of said supporting plates at a side remote from said first of said supporting plates, and
- an opaque liquid between said supporting plates, said opaque liquid having a color contrasting with a color of said third electrodes facing said first supporting plate.

2. A passive display device according to claim 1, wherein said first electrodes are a first set of strip shaped electrodes, said second electrodes are a second set of strip shaped electrodes, and said third electrodes are arranged as columns crossing said second set of strip shaped electrodes substantially at right angles.

3. A passive display device according to claim 2, wherein said columns of said third electrodes are electrically interconnected.

4. A passive display device according to claim 3, wherein said first electrodes form a common electrode.

5. A passive display device according to claim 2, wherein said display parts of said third electrodes have a polygonal shape.

6. A passive display device according to claim 5, wherein said polygonal shape is a hexagon.

7. A passive display device according to claim 1, wherein said second supporting plate is a semiconductor layer having a set of memory elements arranged in rows and columns, said memory elements being driven and being provided with information by a matrix of row and column electrodes provided on said semiconductor layer, wherein said third electrodes are formed by a set of picture electrodes arranged in rows and columns, and wherein each of said picture electrodes is connected to one of said memory elements.

8. A passive display device according to claim 1, wherein the apertures in said display parts have a size providing switching times of said third electrodes smaller than 1/25 of a second.

9. A passive display device according to claim 1, wherein surfaces of said third electrodes facing said first of said supporting plates form at least two sets of electrodes reflecting light in different colors.

10. A passive display device according to claim 1, wherein at least two sets of filters passing light in different colors are provided on said first electrodes.

11. A passive display device according to claim 1, wherein said display parts of said third electrodes have a polygonal shape.

12. A passive display device according to claim 11, wherein said polygonal shape is a hexagon.

13. A method of manufacturing a passive display device comprising the steps of
- providing a first layer of a first material on a substrate, said first material being etched by a first etchant,
- providing a second layer of a second material on said first layer, said second material being etched by a second etchant,
- providing a pattern of resilient elements in said second layer by photoetching with said second etchant,
- providing a third layer of said first material on said second layer,
- making apertures in said third layer by photoetching with said first etchant at an area where said resilient elements remain,
- providing a fourth layer of a third material on said third layer, said third material being etched by a third etchant,
- providing a pattern of display parts having apertures in said fourth layer by photoetching with said third etchant,
- forming apertures in said resilient elements being connected to said display parts by using said second etchant, said display parts having corresponding areas serving as a mask, and
- removing said third layer and portions of said first layer by undercutting with said first etchant through said apertures and edges of said fourth and second layers.

14. A method according to claim 13, wherein said first layer is aluminum, wherein after providing said first layer, regions of said first layer remaining connected to said substrate are anodized, and wherein upon removing said first layer by undercutting, only non-anodized portions of said first layer are etched away.

15. A method according to claim 14, wherein said second layer is an electrodeposited nickel layer.

16. A method according to claim 15, wherein said fourth layer is a silver layer.

17. A method according to claim 13, wherein said second layer is an electrodeposited nickel layer.

18. A method according to claim 13, wherein said fourth layer is a silver layer.

* * * * *